United States Patent [19]

Keller

[11] Patent Number: 4,506,157
[45] Date of Patent: Mar. 19, 1985

[54] THERMOLUMINESCENCE DOSIMETER TAKING ACCOUNT OF TISSUE DEPTH OF DOSE

[75] Inventor: Manfred Keller, Jülich, Fed. Rep. of Germany

[73] Assignee: Kernforschungsanlage Jülich GmbH, Jülich, Fed. Rep. of Germany

[21] Appl. No.: 336,611

[22] Filed: Jan. 4, 1982

[30] Foreign Application Priority Data

Jan. 14, 1981 [DE] Fed. Rep. of Germany ....... 3100868

[51] Int. Cl.³ .............................................. G01T 1/00
[52] U.S. Cl. ................................. 250/337; 250/484.1; 128/653
[58] Field of Search ................... 250/337, 482.1–484.1; 128/653, 390

[56] References Cited

U.S. PATENT DOCUMENTS

| | | | |
|---|---|---|---|
| 3,790,783 | 2/1974 | Brunskill et al. | 250/484.1 |
| 3,932,758 | 1/1976 | Burghardt et al. | 250/484.1 X |
| 3,983,717 | 10/1976 | Collica et al. | 250/484.1 X |
| 4,286,165 | 8/1981 | Jones et al. | 250/482 X |
| 4,321,287 | 3/1982 | Minamide et al. | 250/484.1 X |

OTHER PUBLICATIONS

K. Becker and Scharmann, "Einfuehrung in die Festkoerperdosimetrie", Verlag Thiemid, Muenchen, (1975), general background.
Gyoergy Uchrin, "A New Type of Extremity Dosimeter", Nuclear Instruments and Methods 175, (1980), pp. 173–175.

Primary Examiner—Kyle L. Howell
Assistant Examiner—Francis J. Jaworski
Attorney, Agent, or Firm—Frishauf, Holtz, Goodman & Woodward

[57] ABSTRACT

Three dosimeter disks of a thickness increasing towards the base piece which is to lie against the skin are used, with a covering of $\beta$ ray window for thermoluminescence dosimetry. In order to provide dosimetry referred to a 70 um depth of living tissue, corresponding to a weight of material per unit area of 7 mg/cm$^2$, it is found that the thermoluminescent dosimeter (TLD) disk, which is next to the $\beta$ window, should have a weight per unit area in the range from 15 to 30 mg/cm$^2$. A three-disk dosimeter should have TLD disks of increasing weight per unit area in the ratio 1:3:7 or, at any rate, the weight of the middle disk should be in the range from 30 to 90 mg/cm$^2$, and the third disk should have a weight of at least 90 mg/cm$^2$. TLD's are conventionally made of LiF crystals embedded in PTFE.

11 Claims, 10 Drawing Figures

FIG.1a
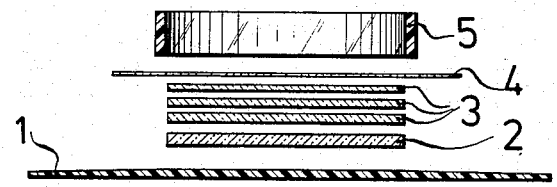
FIG.1b
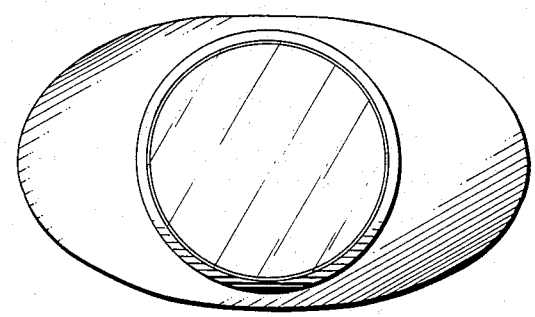
FIG.1c
FIG.2a
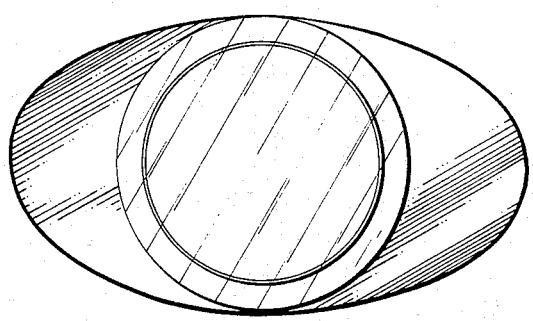
FIG.2b

THERMOLUMINESCENCE DOSIMETER TAKING ACCOUNT OF TISSUE DEPTH OF DOSE

The invention concerns a thermoluminescent dosimeter (TLD) for determining a radiation dose taking account of the tissue depth and particularly the equivalent dose at a depth of 70 um in living tissue, corresponding to a tissue weight per unit of area of 7 mg/cm².

TLD's are known and consist of a material that is put into an excited condition by irradiation with nuclear rays, especially $\beta$ or $\gamma$ rays. They are excited into an energy-rich condition and, by warming, are brought back into the ground state. The light thereby emitted is detected and serves for determination of the dose of radiation received. Lithium fluoride (LiF) crystals embedded in polytetrafluorethylene (PTFE, such as the material sold under the TEFLON trademark) are well suited, among other materials, as detector material equivalent to living tissue.

For monitoring personnel who are exposed to radiation with only slight penetration depth, such as $\beta$ rays, knowledge of the course of the dose in the skin is now important, in particular for the determination of the dose received in the basal layer of the germinative stratum of the skin which is regarded as particularly sensitive to radiation.

Since the penetration depth of the $\beta$ particles varies and the energy spectrum of the $\beta$ rays to be measured is in general unknown, the determination of the radiation loading at a particular depth beneath the skin surface is problematic.

Theoretically, an infinitely thin dosimeter disk should be used behind an absorber representative of the depth under the skin surface that is of interest. In practice, such an arrangement is not usable because the measurement sensitivity would be much too small, and the threshold of detection insufficiently low. In practice there are therefore used slices (hereinafter referred to as disks, although this term is not to be understood as limiting the pieces to circular or round contour) which have a finite thickness, and certain measurement errors are consciously taken into account. With relatively thick disks, the measurement sensitivity is indeed larger and the detection threshold more favorable, but the indication of the dose received at a particularly depth is the more strongly tainted by error, the greater the content in the radiation of low-energy $\beta$ particles having a range of action that is less than the thickness of the dosimeter disk, whereas with detector disks that are too thin, errors resulting from insensitivity must be taken into account, and small values of dose can no longer be detected because of the threshold of detection that is poor for statistical reasons.

Up to now the received dose had been measured with TLD disks of a thickness selected according to the different use locations. Thus, either thin disks with a weight per surface area corresponding to the contemplated depth underneath the skin surface were used, or else relatively thick disks with which there could be measured, with sufficient accuracy the aggregate $\beta$ dose received within the volume of the disk, but not the dose at the legally prescribed depth.

THE INVENTION

Because both of the methods described above were not entirely satisfactory, it became the object of the present invention to develop a new dosimeter to provide better insight into the course of the dose in the skin and particularly to provide a more precise determination of the dose received in the basal layer.

Briefly, to provide such a TLD, use is made of the combination of a thin cover operating as a $\beta$ radiation window with at least one TLD disk adjacent thereto, with the disk immediately against the $\beta$ window having a weight per unit area in the range from 15 to 30 mg/cm². The weight per unit area, of course, for a disk of a particular material mix determines the thickness of the disk.

Preferably at least two TLD disks stacked in combination with a thin covering provided as a $\beta$ window, are used.

The invention proceeds from the recognition that for extrapolation or interpolation of a depth/dose curve, three measurment values are preferred, so that three TLD detectors or disks should be provided in a stack. The determination of the layer thicknesses, or more conveniently the weight per unit area, of the disks and of the covering window film, is found to be decisive and controlling for the usability of such a combination. This thickness or weight per unit area dimension again depends upon the energy of the incident radiation and on the desired output results.

For practical application, TLD's with a $\beta$ window of a covering film that is as thin as possible but of sufficient resistance to tearing, having a weight per surface area of about 1 mg/cm², is usable with an immediately adjacent dosimeter disk of a weight per unit area in the range from 15 to 30 mg/cm², another TLD disk with a weight per unit area in the range from 30 to 90 mg/cm², and a third one with a weight per unit area of 90 mg/cm² or higher.

The invention is based on the recognition that with a first dosimeter disk that is thick with reference to 7 mg/cm² and has a weight per unit area of about 15 to 30 mg/cm², in combination with a thin $\beta$ window, as for example a covering film of about 1 mg/cm², a sufficient accurately determination of the dose at a depth corresponding to an overlay of 7 mg/cm² is possible. Such a depth may simply be referred to a depth "of" aforesaid weight per unit area.

What has just been stated is explained as follows. If for example a dosimeter disk of 14 mg/cm² weight is used, there is found, when the absorption by the thin $\beta$ window is negligible, that for the higher energy components of the spectrum—i.e., for the $\beta$ particles with sufficient energy to penetrate through the detector—there is a quasi-linear decline of dose with depth in the dosimeter disk. The dose measured over the dosimeter volume therefore corresponds to a dose at a depth of 7 mg/cm². The low energy $\beta$ ray content in the energy spectrum that is always present, which is superimposed upon the higher energy $\beta$ ray content, has the effect of producing a sagging curve for the dosing characteristic with respect to the dosimeter depth. This has the result that when a dosimeter disk having a 14 mg/cm² thickness is used, combined with a thin $\beta$ window, the measured dose referred to the desired dose at a depth of 7 mg/cm² is exaggerated in size. It therefore follows that the dosimeter disk must be thicker than 14 mg/cm².

If, on the other hand, a very thick dosimeter disk of, for example, 90 mg/cm² is used, that has the result that the dose measured with this dosimeter disk, referred to the desired dose at a depth of 7 mg/cm², is greatly understated.

In consequence, it is found by the present invention that there is an optimum thickness of TLD disk with which the dose at a depth of 7 mg/cm$^2$ can be determined with sufficient accuracy. Experiments have shown that the optimum thickness of the first dosimeter disk lies between about 15 mg/cm$^2$ and 30 mg/cm$^2$.

On account of the strongly varying thickness of the epidermis, among other things, it is also important to know the course of dose with depth more precisely, particularly for the case of excess doses. It is therefore important, if not necessary, to measure the dose in still other depths of living tissue. In accordance with the invention, this is performed by the provision of second and third dosimeter disks. Whatever is necessary for determining the received body doses can then be found by extrapolation or interpolation of the dose/depth characteristic thus determined. A further advantage in practice is that the dosimeter values measured with several dosimeter disks are more assured, so that the reliability of dosimeter measurements with TLD's is substantially improved.

The choice of the weight per surface area of the second and third dosimeter disks is less critical. For the second disk, the weight per unit area can be in the region from 30 mg/cm$^2$ to 90 mg/cm$^2$, and for the third one around 90 mg/cm$^2$ and thereabove. In practice, it has been found that it is satisfactory for the second and third dosimeter disks to be disks of equal thickness of a weight per unit area of, for example, about 90 mg/cm$^2$.

If the dose is to be determined for greater tissue depths, it is useful to interpose one more tissue-equivalent absorber disk between the second and third dosimeter disks, so that an extra-thick slice of dosimeter material is not necessary. An extra-thick third detector disk, however, would have an advantage for dose determination in deep-lying tissue parts in providing a very deep detection threshold and high measurement sensitivity.

A particularly convenient scheme of measurement for dosimeters according to the invention is provided if the dosimeter has a $\beta$ window in the form of a relatively thin covering film and three TLD disks of different thicknesses in the ratio, at least approximately, of 1:3:7, with the dosimeter disk of smallest weight per unit area facing the $\beta$ window. The thickness ratio of 1:3:7 is derived from the consideration that if the decline of dose with depth is assumed to approximate an exponential reduction of the dose, the drops in dose level from one disk to the next involve an order of magnitude and consequently the dose reduction in the dosimeter disks should take place in three steps of equal value.

Apart from the correct dimensioning of the disk thicknesses, it is important that three disks should be congruently stacked one over another in a simple way in a form easy to handle. The congruence of the stack can easily be obtained by means of a retaining ring that is producible readily by simple means. The stack of dosimeter disks covered by the cover film can be fitted or pressed into the retaining ring. The underside can be provided with an additional base plate that can likewise be pressed into the retaining ring.

In order to fasten the capsule in a capsule holder, it has been found convenient to apply an elastic strip to the base plate. This strip can be bonded by adhesive or by fusion to the base plate (FIG. 1). Another embodiment of the device suitable for production in large quantity involves the fusing of the dosimeter disks in such a way that one somewhat thicker sheet serves as a carrier on which a thin sheet or film (lamina) serving as the $\beta$ window is heat-bonded (welded, fused, see FIG. 2).

The capsule thus produced can be set into a finger ring or a finger cap that has a suitable opening for inserting and seating the capsule.

In another variation, the capsule can be set into a sort of adhesive plaster to be applied to the skin or in a strap of more or less length equipped with a buckle or hooked material ("VELCRO", for example) closure.

BRIEF DESCRIPTION OF THE DRAWINGS

The invention is further described by way of illustrative example, with reference to the annexed drawings, in which:

FIG. 1a is an exploded side view, in mid-section, of the elements of a dosimeter capsule according to the invention prior to their assembly;

FIG. 1b and FIG. 1c respectively show the assembled capsule in section and in plan view;

FIG. 2a and FIG. 2b respectively show, in section and in plan view, another embodiment of dosimeter capsule according to the invention.

DESCRIPTION OF THE ILLUSTRATED EMBODIMENTS

Figure 3A:
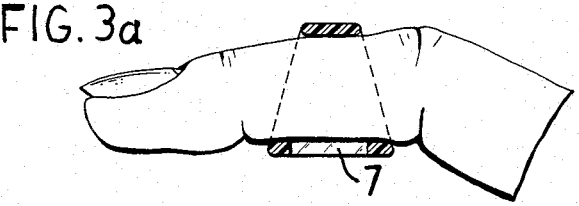
FIGS. 3a, 3b, 3c, 3d and 3e respectively show various embodiments of capsule-holding devices.
Figure 3B:
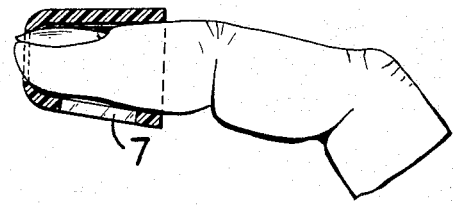
Figure 3C:
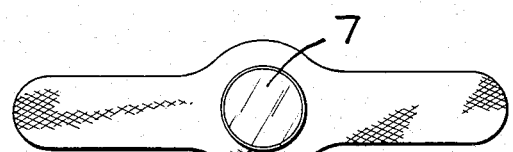
Figure 3D:
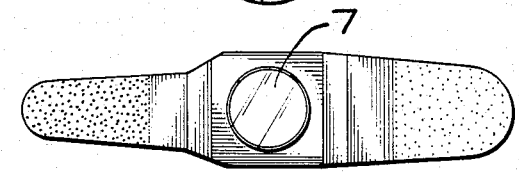
Figure 3E:
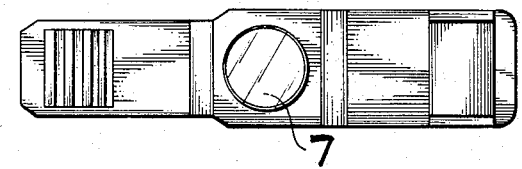

FIGS. 1a and 1b show the construction of a dosimeter capsule with a flexible base patch 1 adhering thereto. The individual parts are illustrated in FIG. 1a, ordered in the sequence desired in the completed dosimeter. There is the patch or strip 1 for use next to the skin and then, in ascending order, a base plate 1, a base plate 2, three dosimeter disks 3 of different thicknesses and finally a $\beta$ window 4 for covering the stack of dosimeter disks. The entire arrangement of these parts is pressed into the retaining ring 5 in a simple manner, assuring a congruent stacking of the dosimeter disks 3 one above the other. The completed assembly is illustrated in FIG. 1b, in section, and in FIG. 1c in plan view.

FIGS. 2a and 2b show a variant form in which the base plate 2 and the retaining ring 5 are omitted, and the dosimeter disks 3 are connected with the base plate 1, by fusion bonding or adhesive, with the help of the somewhat broadened $\beta$ window sheet 4 which has a bottom flange 6 which can be bonded onto the base patch 1.

The device thus produced can easily be set into various kinds of holders, such as are shown in FIGS. 3a, 3b, 3c, 3d and 3e. FIG. 3a shows a finger ring, FIG. 3b a finger cap, FIG. 3c an adhesive plaster, in strip form, FIG. 3d holding strap with a burr closure (e.g., "VELCRO") and FIG. 3e a holding strap with a buckle closure. The base patch or strip 1 directly assures that the capsule will not fall out through the openings 7 in the various illustrated holders. It is to be understood that when one of the illustrated holders is used, the base patch 7 does not have to be adhesive to the skin, and in the usual case it would be made in quantity in a form bonded only to the rest of the dosimeter capsule by adhesive or heat fusion and would be held against the skin by a holder, such as one of those illustrated in FIGS. 3a, 3b, 3c, 3d and 3e. The latter figures in each case illustrate the holder without the capsule inserted. The capsule is inserted in each case so that the base patch 1 is against the skin, with the capsule projecting outward through the hole 7 provided in the holder and being held in place by the holder.

Instead of the various holders shown in the last-mentioned figures, a secure seating of the capsule, with or without the somewhat outwardly extending base patch 1, could be provided by otherwise equipped holders, using projections, a clip, or other means, for positioning the capsule securely with respect to the holder. It will, more generally, be understood that although the invention has been described with respect to particular illustrated embodiments, other variations and modifications are possible within the inventive concept.

I claim:

1. A thermoluminescence dosimeter for measuring radiation doses in dependence on living tissue depth, with a capability of measuring the equivalent dose at a tissue depth of 70 um corresponding to a weight of tissue per surface area of 7 mg/cm$^2$, comprising the combination of a thin cover having a weight per unit area substantially less than 4 mg/cm$^2$ capable of serving as a $\beta$-ray window and at least two thermoluminescence dosimeter disks of equal area stacked adjacent thereto including a thermoluminescence dosimeter disk having a weight per unit area in the range from 15 to 30 mg/cm$^2$ which is located immediately adjacent to said $\beta$-window cover and a second disk having a weight per unit area exceeding 30 mg/cm$^2$.

2. A dosimeter as defined in claim 1, in which three dosimeter disks of different weight per unit area are stacked adjacent to said $\beta$-window cover, with the dosimeter disk facing said cover having the smallest weight per unit area and the middle disk having a weight per unit area less than that of the disk farthest away from said cover.

3. A dosimeter as defined in claim 2, in which the ratio of the values of weight per unit area of the three dosimeter disks is substantially 1:3:7.

4. A dosimeter as defined in claim 2 or claim 3, in which the weight per unit area of the middle dosimeter disk is in the range from 30 mg per cm$^2$ to 90 mg per cm$^2$, and the weight per unit area of the dosimeter disk farthest away from said cover is at least 90 mg per cm$^2$.

5. A dosimeter as defined in claim 4, in which the weight per unit area of said $\beta$-window cover is approximately 1 mg/cm$^2$.

6. A dosimeter as defined in claim 4, in which an absorber disk is interposed between the second and third dosimeter disks in order of their distance from the $\beta$-window cover, said absorber disk having a thickness corresponding to the depth dose to be measured.

7. A dosimeter as defined in claim 1, in which said dosimeter disks are encapsulated between said $\beta$-window cover and a flexible base sheet serving as carrier, by surface fusion or adhesive bonding of said cover to said base sheet.

8. A dosimeter as defined in claim 1, in which said $\beta$-window dover and said dosimeter disks are confined in a closely adjacent retaining ring and said disks are encapsulated by provision of a flexible base sheet to which a face surface of said ring remote from said cover is adhesively bonded.

9. A dosimeter as defined in claim 8, in which a capsule base is provided into which said retaining ring is press-fitted and in which said capsule base, as well as said ring, is connected to said base sheet.

10. A dosimeter as defined in claim 8, in which said base sheet is constituted by an elastic holding strap connected to said capsule base.

11. A dosimeter as defined in claim 7, 8 or 9, in which said base sheet is provided with, or in the shape of holding means so as to constitute a finger ring, a finger cap or an adhesive plaster.

* * * * *